United States Patent [19]

Håbro

[11] Patent Number: 4,518,224

[45] Date of Patent: May 21, 1985

[54] OMNIDIRECTIONAL REFLECTOR WITH HELICALLY TURNED SEGMENTS

[76] Inventor: Bertil Håbro, 18, Roderstigen, S-181 43 Lidingö , Sweden

[21] Appl. No.: 522,345

[22] Filed: Aug. 11, 1983

[30] Foreign Application Priority Data

Sep. 1, 1982 [SE] Sweden ................................ 8204992

[51] Int. Cl.[3] ................................................ G02B 5/10

[52] U.S. Cl. .................................... 350/606; 350/630

[58] Field of Search ............... 350/288, 296, 299; 293; 362/341, 346, 347, 350; 343/895, 836, 837, 840, 912, 914, 916

[56] References Cited

U.S. PATENT DOCUMENTS 1,370,255 3/1921 Zimmerman ................... 362/346 X
2,077,740 3/1934 Caughlan ............................ 350/296

FOREIGN PATENT DOCUMENTS 0684841 4/1964 Canada ................................ 350/296
1134343 4/1961 Fed. Rep. of Germany .
2140366 4/1972 Fed. Rep. of Germany .

*Primary Examiner*—John K. Corbin
*Assistant Examiner*—David Lewis
*Attorney, Agent, or Firm*—Shapiro and Shapiro

[57] ABSTRACT

The present invention relates to an omnidirectional reflector having a light source situated in the center thereof, said reflector being adapted to project a light distribution giving a generally even illumination on the plane under the reflector. This reflector is composed of a number of segments of reflector material which are arranged around the light source and turned helically in the vertical sense of the reflector, said segments at least substantially enclosing the light source and forming a symmetrical body.

11 Claims, 7 Drawing Figures

OMNIDIRECTIONAL REFLECTOR WITH HELICALLY TURNED SEGMENTS

The present invention relates to an omnidirectional reflector having a light source situated in the centre thereof, said reflector being adapted to project a light distribution giving a generally even illumination on the plane under the reflector. Characteristic of the reflector is that it is composed of a number of segments consisting of reflector material which are arranged around the light source and helically turned in the vertical sense of the reflector, said segments at least substantially enclosing the light source and forming a symmetrical body.

The invention and the theory of it will be described more fully below with reference to the accompanying drawings, in which.

Figure 1:
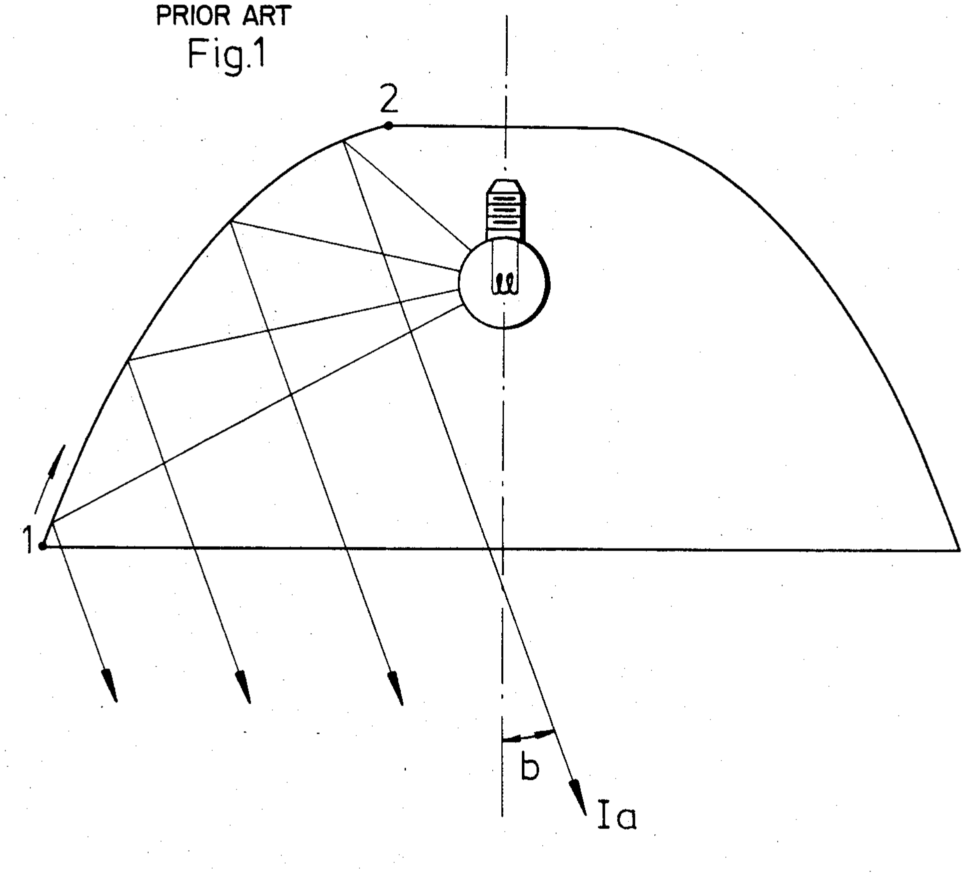
PRIOR ART Fig.1
FIG. 1 shows a vertical cross-section of a per se known rotation-symmetrical omnidirectional reflector.

As appears from FIG. 1 a rotation-symmetrical omnidirectional reflector has the form or curvature apparent from the curve extending between points 1 and 2 which normally consists of a parabola or ellipse. This curve has been modified to project the light distribution $I_a=f(a)$ which is to give an even horizontal illumination in lux on the plane under the reflector. How large the illuminated surface will be is determined by the height of the reflector above the plane but also to a high degree by the angle b, i.e. how broad-radiating the reflector is.

The light strength can be defined as $I_a=A\cdot L\cdot \text{Cos } b$, where A is the luminant surface, L is the luminance of this surface and b the angle which this surface forms with the illuminated plane. From this it is apparent that the reflector should have a large area to give as high an efficiency as possible.

The reflector according to the present invention is composed of a number of circle segments 3 which helically or spirally enclose a light source 4 completely or almost completely. As appears from FIG. 3 the segments form a major or minor portion of a sphere. According to FIG. 4 the segments form a cylinder. The segments can also form figures derived from the forms shown in FIGS. 3 and 4.

By constructing the reflector in the following manner it is possible to create a large-area reflector giving a high and even lighting level on a horizontal plane under the reflector.

When an omnidirectional effect is desired the reflector is constructed so that each segment in a horizontal plane will have a radiation angle corresponding to 360° divided by the number of segments.

Figure 2:
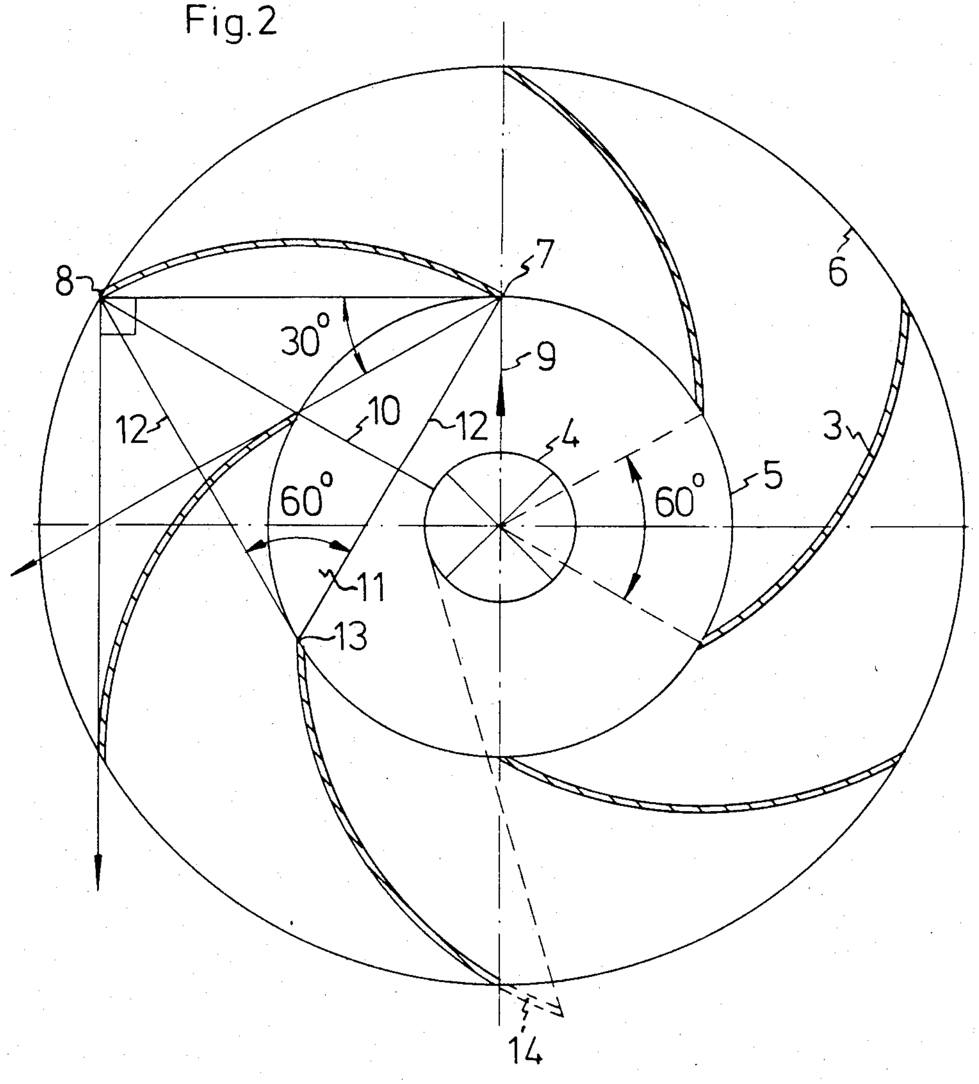
FIG. 2 shows a horizontal section of a preferred embodiment of the omnidirectional reflector according to the invention.

The preferred reflector shown in FIG. 2 is built up of six segments 3 and each segment should consequently have a radiation angle of 60°. The segments 3 are evenly distributed around the light source 4 and disposed between two concentric circles, the inscribed circle 5 and the circumscribed circle 6, arranged around the light source 4. Between these circles straight lines are drawn from a tangential point 7 on the inscribed circle 5. The angular distance between the tangential points 7 will in this case be 60°. A beam 9 from the light source 4, which strikes a point 7, is to be refracted at an angle of 30° from line 7-8; in a corresponding manner a beam 10 from the light source 4, which strikes a point 8, is to be refracted at right angles to line 7-8. This is effected in that the line 7-8 is allowed to constitute the base of an isosceles triangle the apex 13 of which constitutes the centre of curvature for the segment 3 having the form of a circular arc extending between points 7 and 8. The radius 12 of the circular arc is thus equal to a side of the isosceles triangle.

The number of segments 3 in the reflector is at least four and preferably six. According to FIG. 2 the number of segments 3 is six. In this case the isosceles triangle will be equilateral provided that the circumscribed circle 6 has double the diameter of the inscribed circle 5. Hence the top angle 11 is equal to 60°. As the angle between the outgoing beams 9 and 10 is 60° the radius of the circumscribed circle 6 will quite simply be twice as large as the radius of the inscribed circle 5 when the segments 3 are six in number.

As a light source 4 normally has a certain extent the circle segments 3 may be allowed to continue a distance outside the circumscribed circle 6 at 14 in order to screen off the light source 4 without therefore substantially impairing the other light characteristics of the reflector.

The reflector is made in that each segment 3 is turned helically upwards or possibly also downwards round the light source 4 in such a way that the point 7 moves at the same distance from the centre and where the angle gradient in the inclination of the spiral or helix gives the corresponding inclination of the light beam in relation to a vertical line as that which would be obtained in an equivalent section in the rotation-symmetrical reflector.

Figure 4:
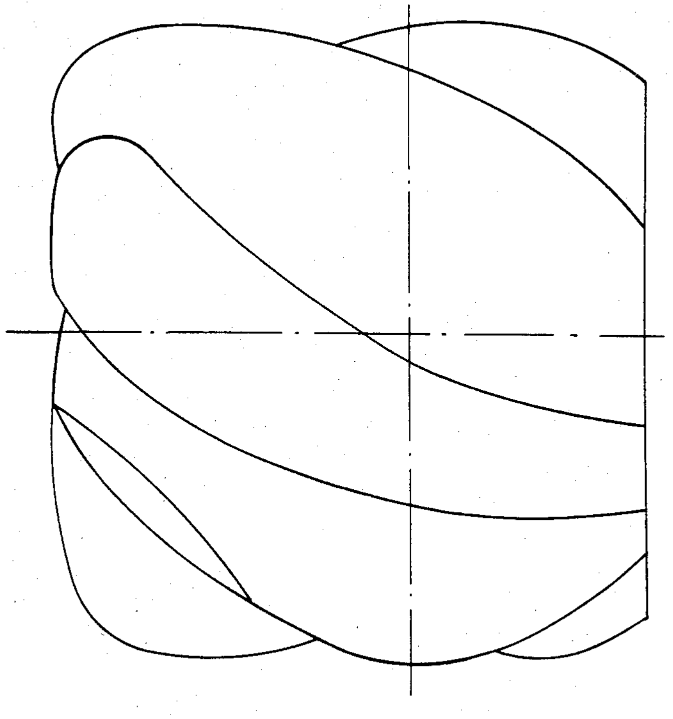
FIGS. 3 and 4 are side views showing two different embodiments of the reflector according to the invention.
Figure 3:
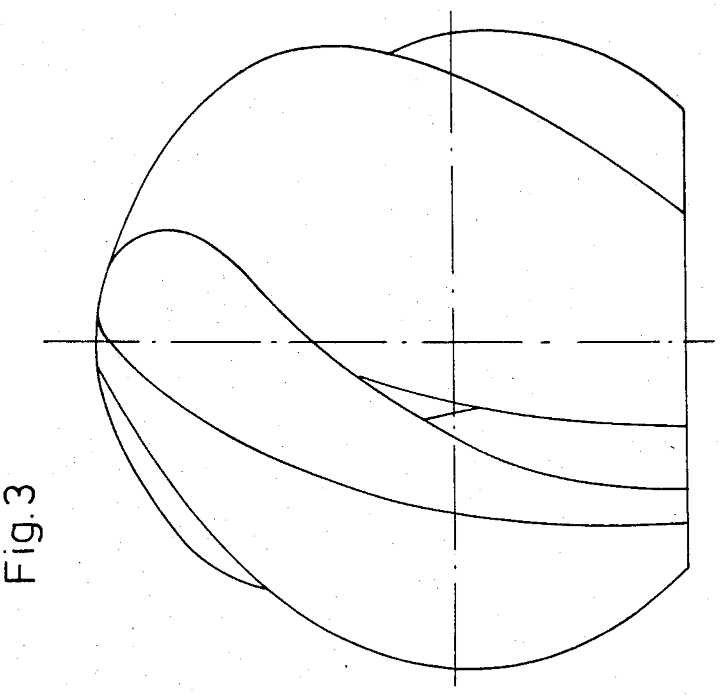
Figure 7:
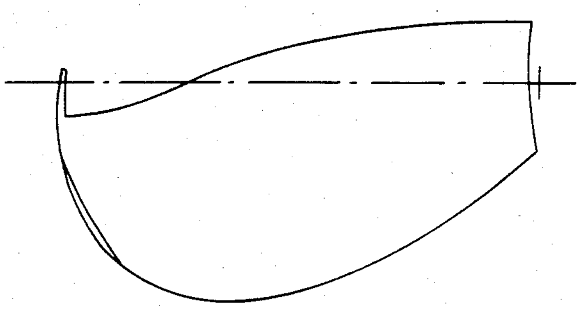
FIGS. 5–7 show a reflector segment, as seen from three different directions, according to the embodiment shown in FIG. 3.
Figure 6:
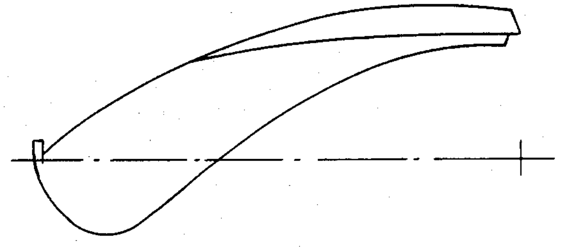
Figure 5:
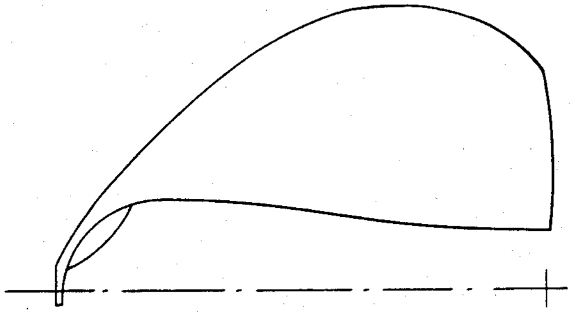

If the circles described above, the inscribed circle 5 and the circumscribed circle 6, have unchanged diameters throughout the height, then the segments 3 form together a cylinder-shaped reflector which is shown in FIG. 4. The tangential point 7 described above can also move upwards at a varying distance from the centre so that a spherical shape will be obtained, as shown in FIG. 3.

It will be clearly apparent that if the point 7 moves spirally upwards with a certain angle gradient the point 8 will at the same time move upwards with a higher angle gradient. Thus, it will be the spiral shape along the inscribed circle 5 that decides the screening-off angle of the reflector, i.e. the highest angle in relation to the vertical line over which no beams are reflected.

It is apparent from the foregoing description and the accompanying drawings that the present invention provides a reflector of generally spherical or cylindrical shape that is substantially symmetrical about a vertical axis and that is open at its bottom to project a desired omnidirectional light distribution pattern on a horizontal plane under the reflector. In order to provide high efficiency, the effective surface area of the reflector is increased by constructing the reflector of a number of segments of reflective material arranged around a central light source, the segments being helically turned upwardly (or upwardly and downwardly) about the light source, substantially enclosing the light source, and being fixedly disposed and oriented with respect to each other to provide successive reflective surfaces with space therebetween whereby light from the source may impinge upon the reflective surfaces and be reflected therefrom onto the horizontal plane beneath the reflector. As is apparent from FIG. 2, the disposition and orientation of the segments 3 is such that substantially the entire reflective (concave) surface of each segment is exposed to light from the light source 4, thereby maximizing the effective surface of the segments 3.

The invention is not restricted to that described above and shown in the drawings but may be modified within the scope of the appended claims.

What I claim and desire to secure by Letters Patent is:

1. A reflector having a central light source and adapted to provide a substantially even omnidirectional light distribution on a horizontal plane under the reflector, comprising a plurality of segments of reflective material arranged around the light source in fixed relation to each other and helically turned about the light source vertically, the segments at least substantially enclosing the light source and forming a body that is substantially symmetrical about a vertical axis of the reflector and that is open at the bottom of the reflector, the segments being disposed and oriented with respect to each other to provide successive reflective surfaces with space therebetween whereby light from the source may impinge upon the reflective surfaces and be reflected therefrom onto said horizontal plane.

2. A reflector in accordance with claim 1, wherein the segments are evenly distributed around the light source in horizontal sections through the reflector and in each horizontal section are arranged between an inscribed circle and a circumscribed circle concentric with said vertical axis.

3. A reflector in accordance with claim 2, wherein the diameters of the circles are substantially constant throughout the height of the reflector, so that the segments define a substantially cylinder-shaped body.

4. A reflector in accordance with claim 2, wherein the diameters of the circles vary along the height of the reflector so that the segments define a substantially spherical body.

5. A reflector in accordance with claim 2, wherein the reflector comprises at least four segments.

6. A reflector in accordance with claim 2, wherein the reflector comprises six segments.

7. A reflector in accordance with claim 2, wherein the segments extend slightly beyond the circumscribed circle.

8. A reflector in accordance with claim 2, wherein the segments are shaped and arranged such that in said horizontal sections the segments have a radiation angle corresponding to 360° divided by the number of segments.

9. A reflector in accordance with claim 8, wherein the segments form circular arcs in said horizontal sections, each circular arc extending from the tangential point of a straight line tangent to the inscribed circle to an intersection point of said line with the circumscribed circle.

10. A reflector in accordance with claim 9, wherein each arc has its center of curvature at the apex of an isosceles triangle the base of which is said straight line.

11. A reflector in accordance with claim 9, wherein each circular arc has its center of curvature at the apex of an equilateral triangle, one side of which is said straight line and the other sides of which extend from the ends of said straight line to said apex, wherein the diameter of the circumscribed circle is twice the diameter of the inscribed circle, and wherein the reflector comprises six uniformly distributed segments.

* * * * *